United States Patent [19]
Kwon

[11] Patent Number: 5,992,910
[45] Date of Patent: Nov. 30, 1999

[54] EYEBOLT ASSEMBLY

[76] Inventor: Soon Chil Kwon, Olympic Sunsu Kijachon APT., 310 Dong 509 HO, Song-Pa-Gu, Bang-1-Dong #89, Seoul, Rep. of Korea

[21] Appl. No.: 09/108,989

[22] Filed: Jul. 1, 1998

[51] Int. Cl.⁶ .............. B66C 1/66; F16B 45/00
[52] U.S. Cl. ............ 294/1.1; 294/89; 411/400; 411/544; 411/916
[58] Field of Search .................. 294/1.1, 82.1, 294/89; 411/10, 11, 313, 400, 401, 535, 544, 916; 248/499; 52/698, 704, 125.2, 125.5, 125.6

[56] References Cited

U.S. PATENT DOCUMENTS

| | | | |
|---|---|---|---|
| 4,450,616 | 5/1984 | Morita | 411/544 |
| 4,699,410 | 10/1987 | Seidel | 294/1.1 |
| 4,958,970 | 9/1990 | Rose et al. | 411/544 |
| 5,112,178 | 5/1992 | Overhues | 411/544 |
| 5,125,861 | 6/1992 | Freeman | 294/1.1 |
| 5,183,360 | 2/1993 | Freeman | 294/82.1 |

FOREIGN PATENT DOCUMENTS

| | | | |
|---|---|---|---|
| 1411033 | 8/1965 | France | 294/89 |
| 2580-613 | 10/1986 | France | 294/1.1 |
| 5-301693 | 11/1993 | Japan | 294/1.1 |

*Primary Examiner*—Dean J. Kramer
*Attorney, Agent, or Firm*—Dillis V. Allen, Esq.

[57] ABSTRACT

A hanger assembly for attachment to heavy loads in material handling systems such as overhead conveyors where the hanger must be angularly aligned with the conveying element such as an attached cable. The hanger includes a base, a threaded stud for load attachment, and a hanger such as the eye in an eyebolt assembly, an example of a hanger assembly. A washer positioned around the threaded stud between the base and the load is hardened substantially less than the hanger itself enabling the hanger to be rotated up to 180 degrees after initial tightening without over torquing the threaded stud. The washer has a plurality of radial slots in one face that maintain the structural integrity of the washer under high rotational and compression loading.

21 Claims, 2 Drawing Sheets

EYEBOLT ASSEMBLY

BACKGROUND OF THE INVENTION

Eyebolt assemblies and swivel shackle assemblies have been used for many years in conjunction with cables and a hoist to lift and move heavy objects about the workplace, such as dies, molds, heavy castings, etc. The swivel shackle assemblies typically include a "U" shaped shackle member that is pivotal on a swivel body that in turn is rotatable about an axis on a base that is perpendicular to the swivel axis of the shackle on the base. This enables the shackle to accommodate two axes pivotal movement which is necessary for the geometry of the hoist arrangement.

In a typical hoist arrangement, an overhead crane has a depending single cable that is tied to four (more or less) outwardly extending cables connected to the eyebolts or shackle assemblies. Each eyebolt or shackle assembly typically has a threaded fastener extending centrally therethrough that bolts the shackle directly to the top surface of the die or mold.

The following patents are representative of the prior art relating to dual axis hoist fastener assemblies.

The Andrewe, et al., U.S. Pat. No. 3,297,293, issued Jan. 10, 1967; the Tsui, et al., U.S. Pat. No. 4,705,422, issued Nov. 10, 1987; and the Chandler, U.S. Pat. No. 5,352,056, issued Oct. 4, 1994, all show swivel shackle assemblies having a "U" shaped member or shackle that is pinned to a rotary swivel member by transverse pins that are separate from the "U" member itself. In this design, it is necessary to fix these shackle pins in the swivel body.

A second group of patents represented by the Wong, et al., U.S. Pat. No. 4,570,987, issued Feb. 18, 1996; the Tsui, et al., U.S. Pat. No. 4,641,986, issued Feb. 10, 1987; and the Tsui, et al., U.S. Pat. No. 5,405,210, issued Apr. 11, 1995, show hoist swivel shackle assemblies in which the ends of the "U" shaped shackle extend radially inwardly and form the pivotal bosses for the shackle on the swivel body member.

The Mueller, U.S. Pat. No. 3,492,033, discloses a clevis assembly with a locking ring 48 for locking the stud to the load.

The Brawand, U.S. Pat. No. 3,163,901, shows a cargo hook and chain device in which a line holder 14 is detachable from member 10 and adapted to hold one or more load cables 16. The line holder 14 has an arcuate slot that permits its removal from a swivel-type draft line terminal member 10.

The Blatt, U.S. Pat. No. 3,628,820, shows a side pull type swivel-type hoist ring assembly in which the hoist ring is generally perpendicular to the axis of the shoulder screw 28.

The Bateman, U.S. Pat. No. 1,321,356, shows an anchor shank and shackle in which the shackle itself is removable from the anchor shank 9.

The Jergens Manufacturing Co. makes a line of side pull style hoist rings identified as part numbers 47311 to 47319 that have extra-large diameter rings and generally U-shaped swivel members.

In addition to swivel shackle assemblies, eyebolt assemblies have been utilized in similar material handling applications. The eyebolt includes a threaded stud that is threaded into the load and the conveyor cable system usually includes a hook-type element that is connected to the eye of the eyebolt for lifting and conveying the load. Eyebolts have a significant advantage over swivel shackles because they are substantially lower in cost.

Because the eyebolt assemblies have no rotational movement as do swivel shackles, it is necessary that they be rotated so that the eye of the eyebolt assembly is in the same plane as the cable hook and cable. However, this has been found difficult to achieve because once the eyebolt is tightened to the maximum torque, further rotation, in an effort to place the plane of the eye in the same plane as the cable, causes over-torquing frequently resulting in failure of the threaded stud, which of course goes into tension as the eyebolt is torqued, usually done with a steel pipe through the eye. The other alternative to achieve angular orientation of the eye of the eyebolt is to torque the eyebolt to its maximum torque and then back off until the eye is rotated to the desired plane, but this results in the eyebolt becoming loose, which shortens eyebolt life span when utilized with a heavy load and overhead conveyor system and creates a hazard to workers and operators, so the present invention also reduces operator anxiety.

A further problem is that over-torquing to achieve the desired eyebolt angular orientation causes galling and deformation of the washer between the eyebolt and the face of the load.

It is a primary object of the present invention to ameliorate the problems noted above in load carrying hanger assemblies.

SUMMARY OF THE PRESENT INVENTION

In accordance with the present invention, a hanger assembly is provided for attachment to heavy loads in material handling systems such as overhead conveyors where the hanger must be angularly aligned with the conveying element such as an attached cable. The hanger includes a base, a threaded stud for load attachment, and a hanger such as the eye in an eyebolt assembly, one example of a hanger assembly. A washer positioned around the threaded stud between the base and the load is hardened substantially less than the hanger itself enabling the hanger to be rotated up to 180 degrees after initial tightening without over torquing the threaded stud. The washer has a plurality of radial slots in one face that maintain the structural integrity of the washer under high rotational and compression loading. The substantial hardness differential, in the range of 30% to 40% between the hanger and the washer allows the washer to compress significantly after initial tightening to permit at least 180 degrees of further hanger rotation without overloading the threaded member.

This washer compression, accompanied by radial elongation, is further enhanced by a plurality of radial slots on one side of the washer that also serves to maintain the structural integrity of the washer as the hanger exerts high rotational forces on the washer. As noted above, these high forces frequently cause washer non-circular deformation.

Other objects and advantages of the present invention will appear more clearly from the following detailed description.

DETAILED DESCRIPTION OF THE PREFERRED EMBODIMENTS

Figure 1:
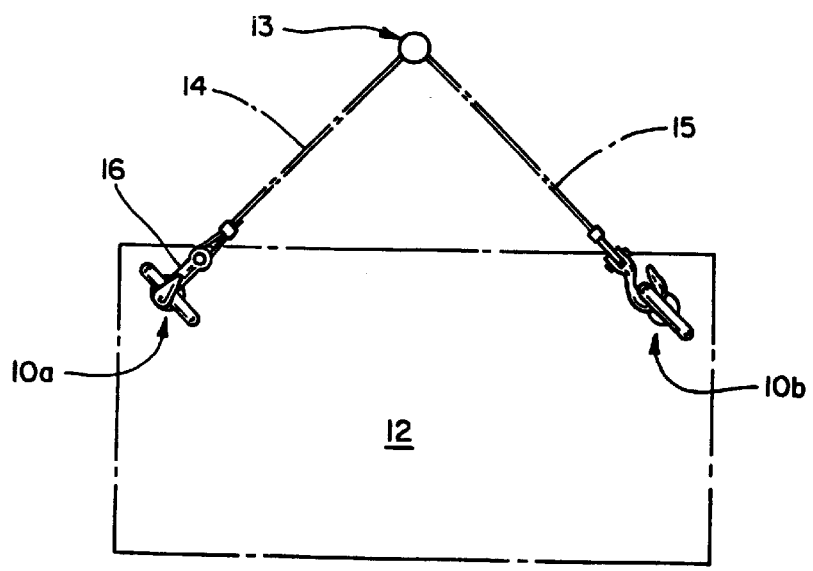
FIG. 1 is a side view of a load with two hangers and part of the overhead conveyor system shown diagrammatically.

Referring to the drawings and particularly the first embodiment illustrated in FIGS. 1 to 4, an eyebolt assembly 10 is illustrated with two such eyebolt assemblies 10a and 10b illustrated in FIG. 1 shown attached to a heavy load 12 and connected to an overhead conveyor system 13 shown only diagrammatically in FIG. 1 with cables 14 and 15 attached to the eyebolts 10a and 10b by hooks 16.

As shown in FIG. 1, the eyebolt assembly 10a is in the incorrect angular orientation and the eyebolt assembly l0b is in the correct angular orientation with the eye of the eyebolt coplanar with the cable 15. As noted above, when the eyebolt 10a in conventional construction is rotated from its position shown on the left in FIG. 1 to a position coplanar with cable 14, over-torquing will likely occur causing washer galling and threaded stud failure, both eliminated with the present invention.

Figures 2, 3:
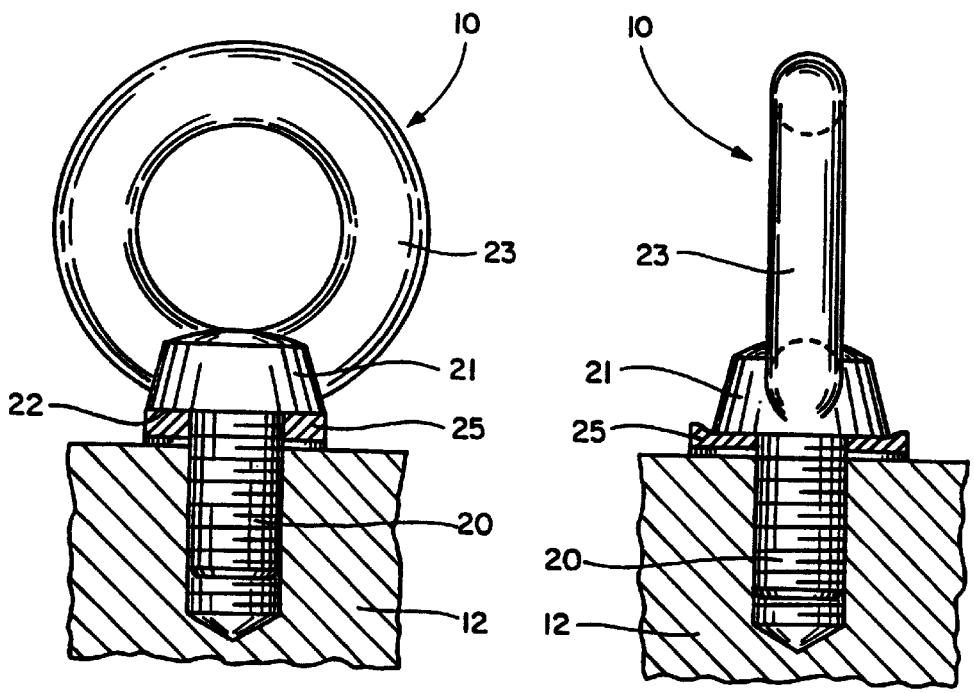
FIG. 2 is a front view of an eyebolt assembly according to one embodiment of the present invention.
FIG. 3 is a side view of the eyebolt assembly shown in FIG. 1 with the eyebolt fully torqued to the correct angular orientation accompanied by axial compression and radial extension of the washer.

Viewing FIGS. 2 and 3, the eyebolt assembly 10 includes a threaded stud 20 extending from a frusto-conical base 21 having a spheroidal ring eye 23 integral therewith. The base 21 has a flat lower surface 22 that engages washer 25 shown more clearly in FIG. 4. The washer 25 has four equiangular slots 27, 28, 29 and 30 therein. The width of the slots 27, 28, 29 and 30 is approximately 40% of the thickness of the washer, and the depth of the slots is approximately 33% of the thickness of the washer 25.

Figure 4:
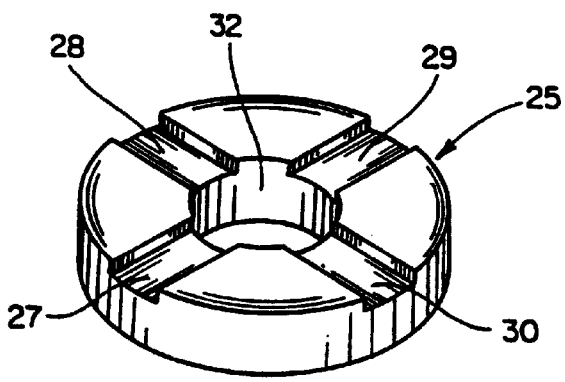
FIG. 4 is a perspective sub-assembly view of the washer utilized in the embodiment of FIGS. 2 and 3.

The washer in the embodiment of FIG. 4 has a central through bore 32 that is unthreaded.

The washer can be made of ferrous and non-ferrous metals with several specific heat treatments. One of the major ferrous materials for making the washer is SCM 440. The thickness of the washer can be between 3 and 15 mm. The central bore on the washer should be formed to be matched to the diameter of the eyebolt. The material is mixed with small mold or turning chips(so called lathe chips) and heated in a closed container at a range of temperature between 700 and 750 degrees C. for several hours. This heat treatment is called "Box Annealing". After several heat treatments, the washer will be cooled off gradually in the furnace. During this cool-off period, the cementite tissue of the material will be formed as a spheroidal shape.

To achieve the desired objective of 180 degrees of rotation of the eyebolt assembly 10 after initial tightening, the eyebolt assembly has a Burnell Hardness (Hb) of least 180, while the washer hardness, also Burnell, is in the range of Hb 110 to 143. As the eyebolt assembly 10 is rotated from its initial tightened position shown in FIG. 2 180 degrees to its maximum loaded position illustrated in FIG. 3; i.e., 180 degrees without over-torquing the stud 20, the washer 25 is axially compressed and also radially extended, although it should be understood that the difference in outer diameter of the washer 25 from FIG. 2 to FIG. 3 has been exaggerated somewhat as has the axially compression shown in FIG. 3.

At this point, the compressed washer has achieved strong inner strengths and condensation effect. This means the washer becomes relatively stronger than pre-compression state. Therefore, the direction of the eye can be arranged to the direction of the hoist equipment in the best ideal position. Furthermore, the connected area of the eyebolt, the washer, and the load are strengthened by the above said structural arrangement. This newly rearranged structure reduces well-known safety problems of eyebolt tremendously.

The slots 27, 28, 29 and 30 also enhance the axial compression of the washer 25, which in turn provides a greater angular range of movement of the eyebolt assembly, but they also maintain the structural integrity of the washer 25, by minimizing galling and the non-circular deformation frequently caused in other eyebolt assemblies by compression of the washer under high torquing loads.

It is also important in this design that the slots 27, 28, 29 and 30 face against the lower surface 22 of the base 21.

Figure 5:
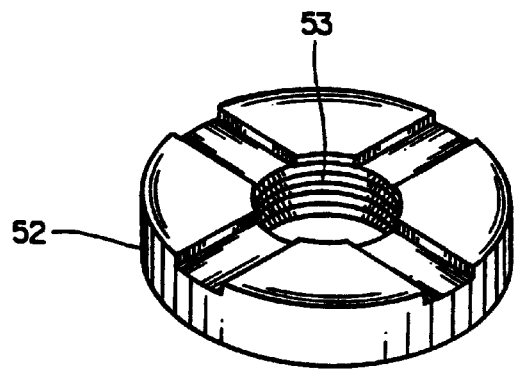
FIG. 5 is a sub-assembly view of the washer according to a second embodiment of the present invention.
Figure 6:
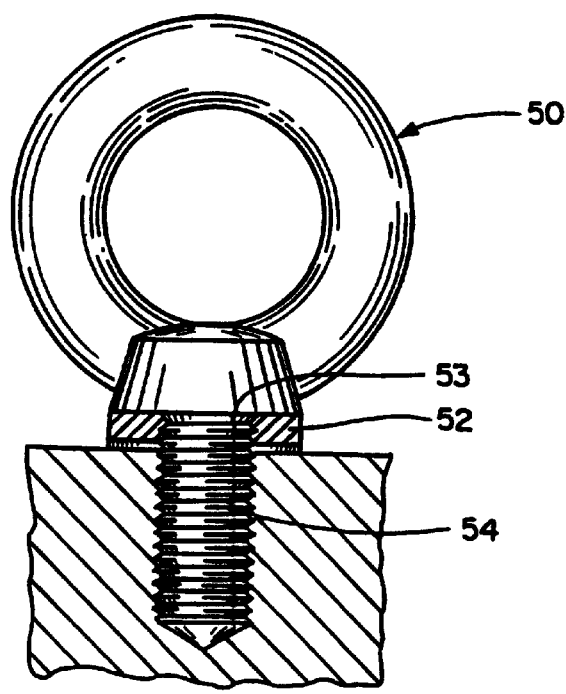
FIG. 6 is a front view similar to FIG. 4 of the eyebolt assembly according to the second embodiment of the present invention.

A slightly modified eyebolt assembly 50 is shown in FIG. 6 that is the same as the eyebolt assembly illustrated in FIGS. 2 and 3 except for washer 52, which has a threaded central bore 53 therein that threadedly engages stud 54 on the eyebolt assembly 50. There is no substantial difference in the operation of the FIGS. 5 and 6 embodiment compared to the FIGS. 2, 3 and 4 embodiment.

After the eyebolt 10, 50 and washer 25, 52 are removed from the load 13, the washer can be heat treated again for the purpose of increasing its hardness. This process is quenching and tempering. The washer that goes through this process can possess more hardness and tighter inner structure. At the same time, the previously adjusted "used" washer can be used with the matched eyebolt to the same load again later very conveniently after being quenched and tempered. When the washer is made by non-ferrous metals, the material should contain 0.2% of Carbon, 17–20% of Chrome (Cr.), and 7–10% of Nickel(Ni). The material should be heated to the high temperature noted above and cooled off rapidly to have a hardness figure below Hb 130 (Brinell Hardness). The rest of the procedures are the same as ferrous metals.

I claim:

1. An eyebolt assembly for achieving the desired angular orientation on an associated load relative to a lifting force, comprising: a non-pivotal eyebolt lying in a plane including a base having an enlarged flat lower surface, a threaded member projecting from the base lower surface adapted to be threaded into an associated load, a generally circular member projecting from the other side of the base forming the eye of the eyebolt, and means for increasing the angular movement of the eyebolt after tightening to place the plane of the eyebolt coincident with the lifting force including a high modulus flat washer surrounding the threaded member and engaging the base, said washer having an upper substantially flat surface engaging a substantial portion of the base lower surface, said washer having a hardness substantially less than the eyebolt base whereby the base lower surface compresses the high modulus washer.

2. An eyebolt assembly as defined in claim 1, wherein the washer has a hardness at least 30% less than the eyebolt base.

3. An eyebolt assembly as defined in claim 1, wherein the base has a Brinell hardness of at least Hb 187 and the washer has a Brinell hardness Hb in the range of 110 to 143.

4. An eyebolt assembly for achieving the desired angular orientation on an associated load, comprising: an eyebolt including a base, a threaded member protecting from one side of the base adapted to be threaded into an associated load, a generally circular member protecting from the other side of the base forming the eye of the eyebolt, and means for increasing the angular movement of the eyebolt after tightening including a washer surrounding the threaded member and engaging the base, said washer having a hardness substantially less than the eyebolt base, said washer having a plurality of radial slots to maintain the integrity of the washer under high loading.

5. An eyebolt assembly as defined in claim 4 wherein the washer slots are generally rectangular in cross section and extend completely across the washer.

6. An eyebolt assembly as defined in claim 5, wherein the slots in the washer face the base.

7. An eyebolt assembly as defined in claim 4, wherein the slots have a width about 40% of the thickness of the washer.

8. An eyebolt assembly as defined in claim 4, wherein the slots have a depth of about 33% of the thickness of the washer.

9. A hanger assembly for achieving the desired angular position on a load relative to a lifting force, comprising; a non-pivotal hanger lying in a plane including a base having an enlarged flat lower surface, a threaded member extended from the base lower surface, a hanger element on the other side of the base, and means for increasing the angular movement of the hanger assembly after initial tightening to place the plane of the hanger coincident with the lifting force including a high modulus flat washer surrounding the threaded member and engaging the base, said washer having an upper substantially flat surface engaging a substantial portion of the base lower surface said washer having a hardness substantially less than the base whereby the base lower surface compresses the high modulus washer.

10. A hanger assembly as defined in claim 9, wherein the washer has a hardness at least 30% less than the eyebolt base.

11. A hanger assembly as defined in claim 9, wherein the washer has a plurality of radial slots to maintain the integrity of the washer under high loading.

12. A hanger assembly as defined in claim 11, wherein the washer slots are generally rectangular in cross section and extend completely across the washer.

13. A hanger assembly as defined in claim 12, wherein the slots in the washer face the base.

14. A hanger assembly as defined in claim 11, wherein the slots have a width about 40% of the thickness of the washer.

15. A hanger assembly as defined in claim 11, wherein the slots have a depth of about 33% of the thickness of the washer.

16. A hanger assembly as defined in claim 9, wherein the base has a Brinell hardness of at least Hb 187 and the asher has a Brinell hardness Hb in the range of 110 to 143.

17. An eyebolt assembly for achieving the desired angular orientation on an associated load, comprising: an eyebolt including a base, a threaded member projecting from one side of the base adapted to be threaded into an associated load, a generally circular member projecting from the other side of the base forming the eye of the eyebolt, and means for increasing the angular movement of the eyebolt after tightening including a washer surrounding the threaded member and engaging the base, said washer having a hardness substantially less than the eyebolt base, and means for stabilizing the washer under high compression including a plurality of radial slots in the washer.

18. An eyebolt assembly as defined in claim 17, said base having a Brinell hardness of at least Hb 187 and the washer having a Brinell hardness Hb in the range of 110 to 143.

19. An eyebolt assembly for achieving the desired angular orientation on an associated load, comprising: an eyebolt including a base, a threaded member protecting from one side of the base adapted to be threaded into an associated load, a generally circular member projecting from the other side of the base forming the eye of the eyebolt, and means for increasing the angular movement of the eyebolt after tightening including a washer surrounding the threaded member and engaging the base, said washer having a hardness substantially less than the eyebolt base, and means for stabilizing the washer under high compression including a plurality of radial slots in the washer, said slots having a depth of about 33% of the thickness of the washer.

20. A hanger assembly for achieving the desired angular position on a load under high forces, comprising: a hanger including a base, a threaded member extending from one side of the base, a hanger element on the other side of the base, a washer surrounding the threaded member and engaging the base, said washer having a plurality of radial slots therein to minimize washer damage under high torque loading.

21. A hanger assembly as defined in claim 20, wherein the washer has a hardness at least 30% less than the eyebolt base.

* * * * *